April 4, 1961

L. H. APPLEMAN 2,978,531

SHIELDING STRUCTURE

Filed April 6, 1959

3 Sheets-Sheet 1

INVENTOR.
LEO H. APPLEMAN
BY
Elliott & Pastoriza
ATTORNEYS

INVENTOR.
LEO H. APPLEMAN
BY
Elliott & Pastoriza
ATTORNEYS

INVENTOR
LEO H. APPLEMAN
BY
Elliott & Pastoriza
ATTORNEYS

United States Patent Office 2,978,531

Patented Apr. 4, 1961

2,978,531

SHIELDING STRUCTURE

Leo H. Appleman, Ojai, Calif., assignor to Topatron, Inc., a corporation of California Filed Apr. 6, 1959, Ser. No. 804,319

8 Claims. (Cl. 174—35)

This invention relates generally to radiation shielding and more particularly to pre-fabricated or knock-down type enclosures for shielding general electronic and laboratory equipment and working personnel against external radiation as well as radiation from equipment within the enclosure to the exterior.

Knock-down type shielding enclosures are well known in the art and a full discussion of various types is set forth in considerable detail in U.S. Patent No. 2,838,592. In all such enclosures, it is desirable to provide shielding panel assemblies which may be erected or dismantled in a minimum of time and yet which insure complete conductive continuity along at least one surface of the various panels making up the enclosure. Preferably, superior performance is achieved if both the inside and outside walls of the radiation shielding enclosure are continuously conductive not only with each other but with the floor and ceiling of the enclosure. Towards this end, it is very important to provide proper joints or supporting members for adjacent panels and at the corners of the enclosures.

With the foregoing in mind, it is a primary object of the present invention to provide an improved prefabricated or knock-down type of shielding enclosure which exhibits superior radiation shielding properties to those presently available.

Another important object is to provide a shielding structure which is easy to assemble notwithstanding the floor area upon which the structure is assembled may be uneven.

Another object is to provide a double panel type shielding structure which is continuously conductive on both inside and outside surfaces to provide a closed cell type of shielding.

A specific object is to provide a novel type of support member for securing adjacent panels together at their adjacent edges both along the walls, floors, and ceiling as well as the corners, which support members serve several functions simultaneously to the end that a minimum number of different shaped components are necessary to provide a complete enclosure.

Still other objects are to provide enclosures and components thereof which are adaptable to either single or double wall construction, which are all metal, and which enable unusually tight joints to be made whereby leakage, moisture problems, and future maintenance problems are minimized.

Briefly, these and many other objects and advantages of the present invention are attained by providing double shielding panels secured together and supported by elongated conductive support members. Each of the support members is preferably defined by four flat sidewalls of equal width at right angles to each other to define a hollow interior of square cross section. The several support members are disposed between panels to retain them in uniformly spaced, parallel relationship. The sidewalls of the members are arranged to overlap the adjacent edges of co-planar panels so that electrical continuity is assured.

Co-operating with the support members are elongated strips, in turn overlapping adjacent side edges of the panels to sandwich these edges between the strips and exterior walls of the support members. A fastening means may then be passed through both of the strips and the support member to clamp the panels in position. Because of the hollow construction of the support member itself, it can readily deform elastically under squeezing pressure of the fastening means and its natural resilient construction results in an opposite force holding the various strips, side edges, and fastening means in secure position.

The support members in co-operation with the panels, therefore, not only serve as a support and conductive means to provide physical and electrical continuity between the panels, but additionally provide a bias pressure to insure a secure joining of the panels. In addition, these support members define with the inside wall surfaces of the double panels, closed cells desirable for maximum radiation shielding.

Essentially, the complete enclosure requires only the various panels and the support members and strips together with suitable fastening means. The support members may all be of the same dimensions in cross section and simply cut to desired lengths from square stock. In certain embodiments, however, it is possible to employ a rectangular shaped support member or even an L-shaped member which could also be cut from standard stock.

A better understanding of the foregoing as well as other features and advantages of the present invention will be had by now referring to preferred embodiments thereof as illustrated in the accompanying drawings in which.

Figure 1:
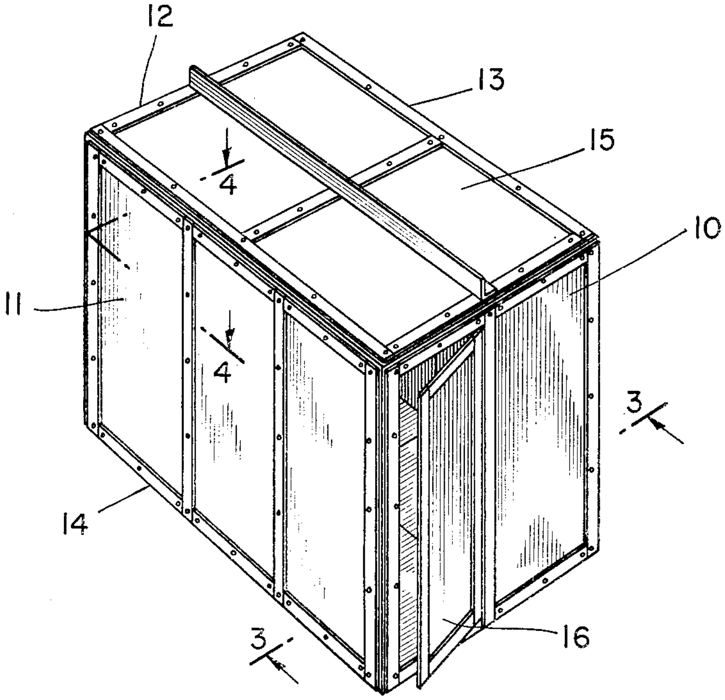
Figure 1 is a perspective view of a radiation shielding enclosure in accordance with the invention.

Referring to Figure 1, there is illustrated a complete radiation enclosure comprising four walls 10, 11, 12, and 13, a floor 14 and ceiling 15. The various walls, floor and ceiling, are made up of double walled panels secured together by suitable support members and retaining strips all as will become clearer as the description proceeds. One of the panel sections may be in the form of a door 16.

Figure 2:
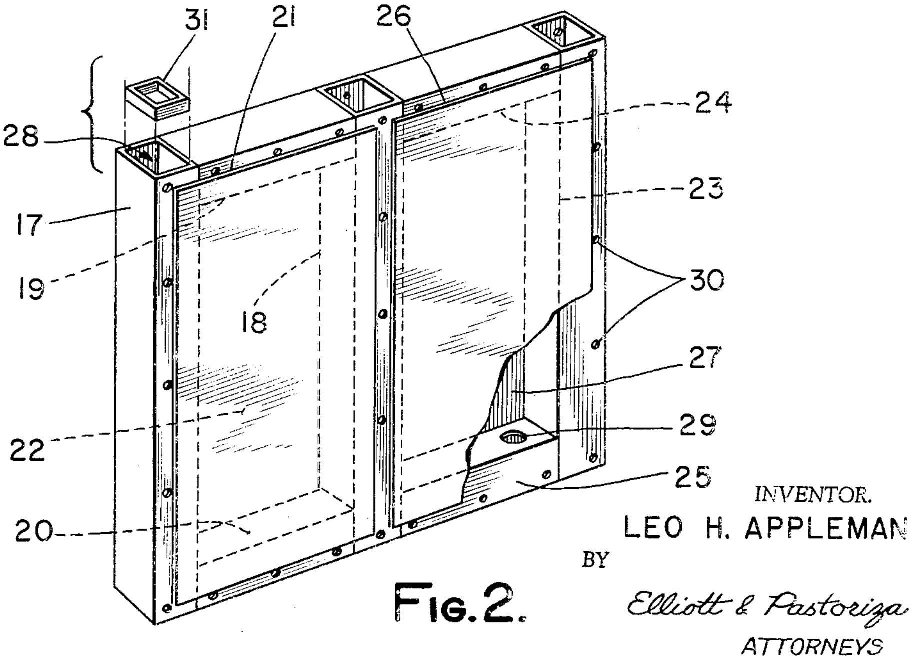
Figure 2 is an enlarged perspective view partly broken away of one wall section of the enclosure of Figure 1.

Figure 2 illustrates a typical double wall section including vertical support members 17, 18 and upper and lower cross support members 19 and 20 disposed between the panel sections 21 and 22. The vertical member 18 together with an end vertical member 23 and upper and lower cross members 24 and 25 serves to secure additional panel sections 26 and 27. As shown in Figure 2, each support member includes four contiguous sidewalls preferably of equal width to define a hollow interior of square cross section as indicated at 28 for the member 17. The various sidewalls making up the supporting member may be provided with circular access openings as indicated at 29 for the member 25. Other openings 30 for receiving suitable fastening means may also be provided. These fastening means and retaining strips to be described subsequently are omitted from Figure 2 to avoid obscuring the drawing.

At corners where the open ends of the support members are exposed, suitable square shaped end caps such as at 31 may be provided to seal off these exposed ends.

While a square cross section is preferably used in order to insure uniform spacing between the various double panels at the corners of the walls and ceiling, it is possible to employ a supporting member of rectangular cross section in areas not subject to a large amount of radiation such as the floor 14. Referring to the cross sectional view of Figure 3, for example, such rectangular type supporting members are illustrated at 32, 33, and 34 running perpendicularly to the plane of the drawing. As shown, these support members are all horizontally disposed and run between double shielding floor panels 35, 36, and 37, 38. The adjacent side edges of the upper co-planar floor panels 35 and 37 are spaced a given distance apart less than the wider width dimension of the support member 33 so that the upper sidewall of the support member 33 overlaps these edges. The lower coplanar panels 36 and 38 are similarly overlapped by the bottom sidewall of the support member 33. The various adjacent edges are secured together by a pair of elongated retaining strips 39 and 40 of width greater than the given spacing between the adjacent edges to overlap the same and sandwich these adjacent edges between the strips and the opposite sidewalls of the support member 33. A fastening means in the form of a bolt 41 may then be passed through the strip 39, support member 33, and threaded into strip 40 to secure the panels in position.

To provide a level floor area without projections, suitable plywood sections such as indicated at 42 and 43 may be disposed over the top floor shielding panels 35 and 37. Suitable recessed areas as indicated at 44 may be provided in the plywood sections where they join to accommodate the protruding strip member 39 and bolt head.

Between the panels 35, 36, and 37, 38, there are shown runners of wood 45 and 46 for additional support. Beneath the lower panels an insulation covering 47 such as Masonite in turn overlying the concrete floor 48 of the building is provided. By this arrangement, good thermal insulation is assured between the floor panels and concrete base. Further, adequate support of the floor double panel shielding is provided so that heavy laboratory equipment within the enclosure will be properly supported.

As mentioned heretofore, the various support members 32, 33, and 34, for example, employed in the floor construction could be of square cross section. By employing rectangular members, however, the level of the floor is kept relatively close to the floor level outside of the enclosure.

Figure 3:
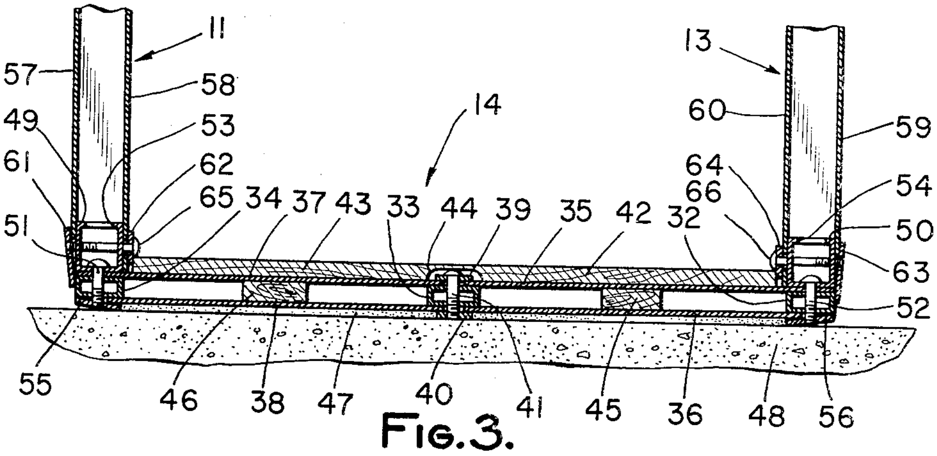
Figure 3 is an elevational cross sectional view of the floor and portions of the sidewalls taken in the direction of the arrows 3—3 of Figure 1.

The various walls such as 11 and 13 may be secured directly to the floor construction as illustrated in the left and right hand portions of Figure 3 by means of the square cross section support members 49 and 50 respectively. Thus, rather than an upper retaining strip such as the strip 39, the bottom sidewall of the horizontal support members themselves may receive bolts 51 and 52 to secure them directly to the floor support members 32 and 34 respectively, the side edges of the upper panels 35 and 37 being disposed between the members as shown. Access holes 53 and 54, similar to the access opening 29 of Figure 2, permit the foregoing connections to be readily effected from inside of the enclosure. The ends of the bolts in turn are threaded into lower retaining strips as indicated at 55 and 56, similar to the strip 40.

After the horizontal support members 49 and 50 have been secured to the floor, the outer wall panels 57 and 59 may then be secured to the outer sidewalls of the respective support members 49 and 50. The inner wall panels 58 and 60 are desirably not assembled until the ceiling structure has been formed. Horizontal retaining strips 61, 62, and 63, 64 are secured by bolts 65 and 66. The outer strips 61 and 63 are preferably wider to overlap the floor support members 34 and 32 and insure good conductivity. Vertical support members similar to the support members 17 and 18 of Figure 2 are also disposed between the panels and secured by suitable retaining strips at adjacent edges of the panels for effecting suitable joints similar to the joining of the floor panels.

Figure 4:
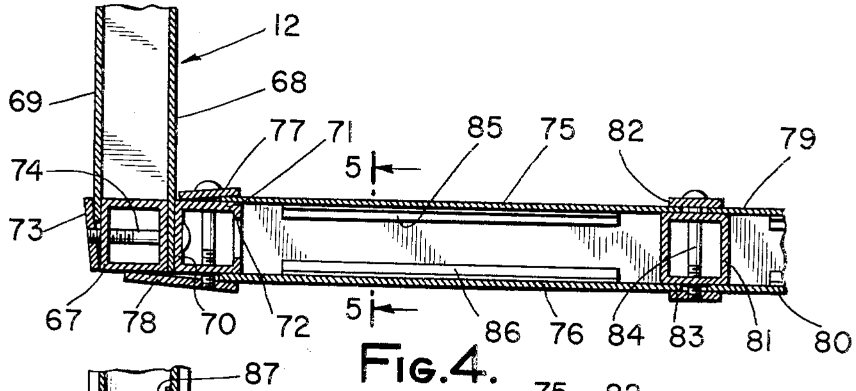
Figure 4 is a cross sectional view of two adjoining walls at the corner defined thereby taken in the direction of the arrows 4—4 of Figure 1.

Referring now to Figure 4, the manner in which adjacent wall portions such as the walls 11 and 12 of Figure 1 are jointed together is illustrated in detail. As shown in the left hand corner portion of Figure 4, there is provided a vertical support member 67 of square cross section of similar construction to the support member 17 shown in Figure 2 serving to support and space the double walled panels 68 and 69 forming the wall 12. The marginal end edge of the inner panel 68 is secured against the sidewall of the support member 67 by the sidewall 70 of a second vertically disposed support member 71 associated with the wall 11. As described in connection with the joining of the lower portion of the wall to the floor, the support member 71 includes an access opening 72 for enabling fastening of an outer retaining strip 73 by bolt 74 passing through the sidewall 70 and the entire support member 67.

The wall 11 as shown includes doubled panel sections 75 and 76 secured to opposite sides of the support member 71. An inner retaining strip 77 serves to secure the inner panel 75 to the support member 71 and a co-operating retaining strip 78 secures the outer panel 76 to the opposite sidewall of the support member 71.

In the corner construction illustrated in Figure 4, it is preferable to make the retaining strip 73 on the exterior of the panel 76 wider than the other retaining strips so as to overlap the support member 67. There will thus be insured good physical and electrical contact between the adjacent support members and the various double walled panels intersecting at right angles to each other.

In joining together the adjacent edges of co-planar panel sections in the various walls such as the wall 11 as illustrated in Figure 4, a construction similar to that employed for joining together adjacent floor panels described in connection with Figure 3 is used. Thus, as shown in Figure 4 the inner and outer panels 75 and 76 have edges in spaced adjacent relationship respectively to inner and outer panels 79 and 80. The given spacing between the adjacent edges is less than the width of the sidewalls defining the support member 81 so that the opposite sidewalls of this support member overlaps these adjacent edges. Suitable elongated retaining strips 82 and 83 also have a width greater than the spacing between the adjacent edges to overlie these adjacent edges as shown so that a single fastening means in the form of a bolt 84 may be passed through the strip 82, support member 81, and threaded into strip 83 to secure the various panels in position.

It will be noted in Figure 4 that the diameter of the bolt 84 is less than the given spacing between the adjacent side edges of the panels so that the same may readily pass therebetween. This feature is also desirable, however, in that it leaves a small spacing between the fastening means itself and the edges so that the adjacent panels 75 and 79 or 76 and 80 may be canted in their own planes. In the event that the floor area were uneven or that there was some difficulty in fitting the lower edges of the panels to their respective support members, such canting can take place to facilitate assembly. Because of the overlap of both of the opposite sidewalls of the support member 81 as well as the strips 82 and 83, however, proper electrical conductivity between adjacent panel sections is assured.

Figure 6:
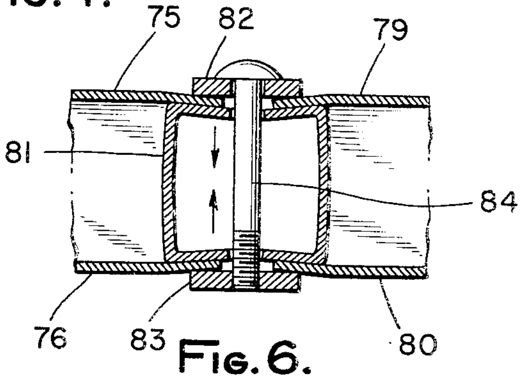
Figure 6 is an enlarged view of a typical joint illustrated in Figure 4.

The combination of the square cross sectioned support member and the retaining strips for providing joints between adjacent panels is a very important feature of the present invention. Referring particularly to the enlarged cross section of Figure 6, for example, as a consequence of the hollow interior of the support member 81, upon tightening of the bolt 84 there will actually be an elastic distortion of the hollow member. As a result an oppositely directed biasing force will be exerted by the member tending to maintain a high squeezing pressure on the adjacent edges of the various panels 75, 79 and 76, 80. Thus, lock nuts or equivalent components are not necessary and the desired physical strength and electrical continuity between the various panels is assured. The tightening of the bolt 84 furthermore tends to exert a stretching force on the adjacent panels 75 and 79; for example, yielding a drum skin tightness to these wall panel members.

Figures 7, 8:
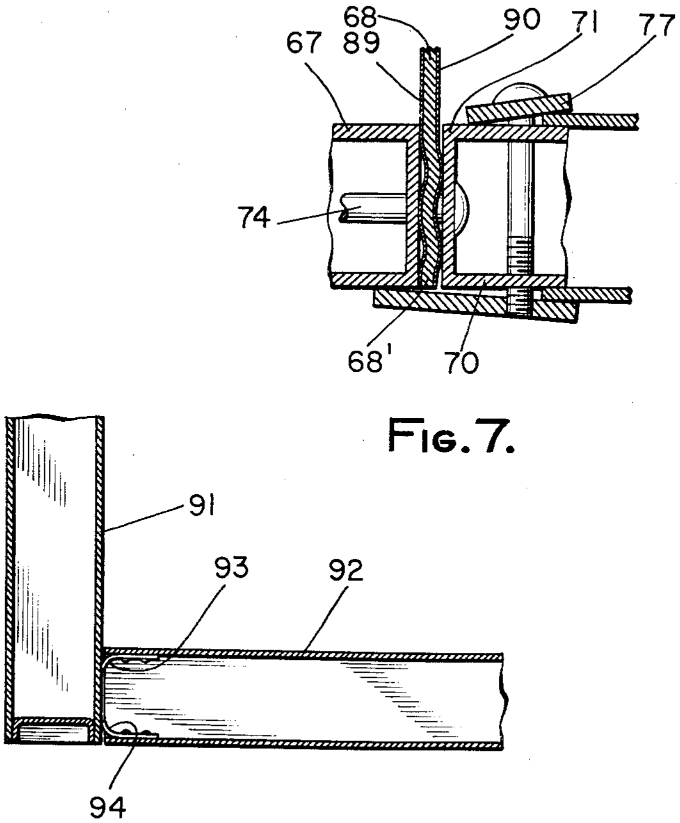
Figure 7 is an enlarged fragmentary cross sectional view of one panel end portion adjacent the corner shown in Figure 4.
Figure 8 is a cross sectional view of two support members meeting at right angles; and, Figure 9 illustrates a modified type of support member.

In order to provide even greater assurance of good electrical conductivity as well as physical strength particularly under conditions of vibrations and the like, marginal edge portions of the various panels may be crimped such as illustrated in Figure 7 for the inner panel 68 of Figure 4. As shown in Figure 7, the portion of the panel edge disposed between the support members 67 and 71 is crimped at 68' so that upon tightening of the bolt 74 the edge portion 68' will be partially flattened but because of the crimping will result in greatly increased frictional gripping by the support members.

Referring once again to Figure 4, it will be noted that as another consequence of the square cross section of the support members, the various double walled panels meeting at right angles are maintained at a uniform spacing. Preferably, the spacing between the double walls is of the order of one and one-half inches resulting in very effective shielding of radiations in the microwave region. It should also be pointed out that the wall panels are preferably in the order of 1/32" in thickness, and the strips 3/32", although these members have been exaggerated in the drawings for purposes of illustration.

Figure 5:
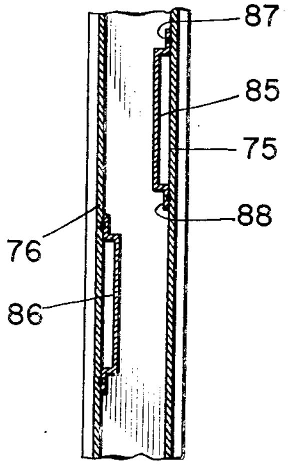
Figure 5 is a cross section of a double panel section taken in the direction of the arrows 5—5 of Figure 4.

To lend strength to the various panels as well as prevent possible bowing thereof which might alter the above referred to spacing therebetween, structural members in the form of "hat" sections such as indicated at 85 and 86 in Figure 4 may be horizontally disposed along the inside surfaces of the various panels. These "hat" sections as best seen in the cross section of Figure 5 are channel-shaped members, the outer edges being flanged as at 87 and 88 for the section 85 and spot welded directly to the inside surface of the panel 75. The other "hat" section 86 employed on the inside surface of the outer panel 76 is disposed below the section 85 to provide a staggered arrangement so that conductive interior portions of the panels are not closer to each other than the distance between the panels themselves.

For maximum shielding, it is desirable particularly for the higher frequencies to provide extremely conductive surfaces on both sides of the various double walled panels. To this end, and with reference to Figure 7, for example, the panels such as the panel 68 may be provided with conductive coatings 89 and 90 of either copper or zinc. If the panels themselves are formed of steel sheets, the combination of the highly conductive copper coating on the steel results in a relatively broad band shielding.

To improve the electrical continuity between panel sections and support members intersecting at right angles such as at the corners of the walls as well as between the walls, floor, and ceiling, conducting leaf springs may be used. Referring to Figure 8, for example, there are shown two support members 91 and 92 intersecting at right angles. On opposite inside walls of the member 92 there are provided leaf springs 93 and 94 having their free ends biased into physicl and electrical engagement with the inner side of the support member 91.

Figure 9:
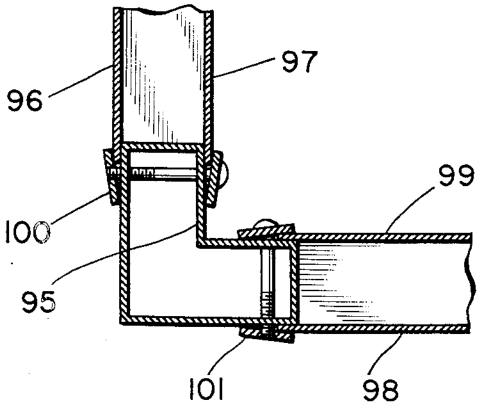

Another means of insuring efficient electrical continuity at corners is illustrated in Figure 9 wherein an L-shaped support member 95 is used. In this embodiment panels 96, 97 and 98, 99 may be secured to opposite sidewalls of the legs of the L-shaped member as shown together with suitable overlapping outer retaining strips 100 and 101. The feature of resilient distortion to provide an opposite biasing force on the fastenings is achieved as a consequence of the hollow interior of the L-shaped member.

From the foregoing description, it will be evident that the present invention enables the construction of a complete double wall shielding enclosure wherein closed cells are defined between the various panels making up the double walls and the square cross section support members. By making both sides of each of the panels conductive and by the crimping feature described and the overlapping of the strips at the various corners, excellent electrical continuity is insured both inside and outside the entire structure. As a result, superior radiation shielding is provided by the instant invention. Further, the provision of uniformly cross sectioned support members minimizes the number of different shaped components making up the entire structure.

While certain preferred constructions have been shown and described, it will be evident that modifications can be made that fall clearly within the scope and spirit of the present invention. The shielding structure is therefore not to be thought of as limited to the exact embodiments set forth for illustrative purposes.

What is claimed is:

1. A shielding structure including: at least one shielding panel having at least one surface thereof electrically conductive; a support member having contiguous sidewalls defining a hollow interior and having electrically conductive outer surfaces, one side edge of said panel overlapping an exterior portion of one of said sidewalls; a retaining strip extending adjacent said side edge to sandwich said side edge between at least a portion of said strip and said exterior portion of said one of said side walls; and fastening means extending entirely through a sidewall portion of said support member opposite said one of said sidewalls to pass through said hollow interior and said one of said side walls and said retaining strip, tightening of said fastening means squeezing said strip, side edge, and support member whereby an opposite biasing force is established by said support member to hold said fastening means, side edge, and strip secure and insure electrical continuity between said one surface and said outer surfaces of said sidewalls of said support member.

2. A shielding structure including: a pair of shielding panels, at least one of said panels having at least one electrically conductive surface; a supporting member having four contiguous sidewalls defining a hollow interior and having electrically conductive outer surfaces, said panels having respective side edges overlapping the exteriors of opposite ones of said side walls so that said panels are spaced apart by said supporting member; a pair of strips sandwiching said respective side edges between said strips and opposite ones of said side walls; and fastening means extending entirely through said strips and said opposite ones of said sidewalls of said supporting member for holding said panels in engagement with said supporting member to provide electrical continuity between said panels.

3. A shielding structure including: double shielding panels; support members having hollow interiors disposed between said shielding panels; strips disposed adjacent to opposite sides of said support members sandwiching side edge portions of said double wall panels therebetween, said panels and sides of said support members having electrically conductive surfaces; and fastening means passing entirely through said strips and support members for exerting squeezing pressure thereon, said support members elastically distorting as a consequence of the hollow interior to provide an opposite force on said side edges, strips and fastening means to secure the same in position and provide electrical continuity between said panels.

4. A shielding structure including: at least two panels co-planarly disposed with their adjacent edges spaced apart a given distance; an elongated support member having four contiguous sidewalls of width greater than said given distance to define a hollow interior, said support member being positioned so that one sidewall thereof overlaps said adjacent edges of said panels; an elongated strip of width greater than said given distance overlapping said adjacent side edges to sandwich the same between said strip and said one sidewall; and a fastening means passing through an opposite sidewall of said support member to extend across said hollow interior through said one sidewall, said fastening means being of a width less than said given width so that it passes between said adjacent edges and through said strip to apply squeezing pressure on said adjacent edges of said panels, the distance between said fastening means and said adjacent edges permitting canting of one of said panels in its plane with respect to the other whereby the alignment of other edges of said panels may be adjusted, said panels and contiguous sidewalls having electrically conductive surfaces so that tightening of said fastening means elastically distorts said support member as a consequence of its hollow interior to establish a tight back pressure securing said panels, strips, and fastening means in position to provide electrical continuity between said panels.

5. The subject matter of claim 4, including two additional panels co-planarly disposed in parallel relationship to said first mentioned panels and having their adjacent edges spaced substantially said given distance and respectively overlapped by said opposite wall of said support member; and an additional elongated strip overlapping the adjacent side edges of said additional panels to sandwich the same between said additional strip and said opposite wall, said fastening means initially passing through said additional strip and between the adjacent edges of said additional panels whereby a double panel structure is provided.

6. A radiation shielding structure including: double shielding panels having electrically conducting surfaces; elongated support members each having four flat sidewalls of equal width at right angles to each other to define a hollow interior of square cross section, said sidewalls having electrically conductive surfaces, said support members being disposed between the adjacent side edges of co-planar adjacent panels to hold said panels in spaced apart relation; elongated strips overlapping said adjacent side edges to sandwich the same between said strips and opposite sidewalls of said support members; and fastening means passing through said strips and adjacent support members between said side edges of said panels to secure said panels in position, certain ones of said support members being disposed generally parallel to the respective sides and end edges of said double shielding panels to define closed cells between said double shielding panels, tightening of said fastening means elastically distorting said support member as a consequence of its hollow interior to establish a tight back pressure securing said panels, strips and fastening means in position to provide electrical continuity between said panels.

7. The subject matter of claim 6, in which some of said double shielding panels are disposed at right angles to others of said double shielding panels to define corners so that two elongated support members are positioned next to each other at said corners, the strips associated with one of said support members having a sufficient width to overlap an exposed sidewall of the other of said support members to insure structural and electrical continuity at said corners.

8. The subject matter of claim 7, in which panel side edges secured between adjacent elongated support members at said corners are initially crimped to provide frictional gripping thereof when squeezed between exterior walls of said support members.

References Cited in the file of this patent

UNITED STATES PATENTS

| | | |
|---|---|---|
| 2,076,728 | Keller | Apr. 13, 1937 |
| 2,831,912 | Williams | Apr. 22, 1958 |

FOREIGN PATENTS

| | | |
|---|---|---|
| 229,330 | Switzerland | Jan. 17, 1944 |
| 744,723 | Great Britain | Feb. 15, 1956 |